United States Patent
Sommer et al.

(10) Patent No.: US 9,079,663 B2
(45) Date of Patent: Jul. 14, 2015

(54) CANARD-LOCKED OBLIQUE WING AIRCRAFT

(71) Applicant: Northrop Grumman Systems Corporation, Falls Church, VA (US)

(72) Inventors: Geoffrey S. Sommer, Redondo Beach, CA (US); Kenneth A. Cote, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 32 days.

(21) Appl. No.: 14/185,465

(22) Filed: Feb. 20, 2014

(65) Prior Publication Data

US 2014/0239117 A1 Aug. 28, 2014

Related U.S. Application Data

(60) Provisional application No. 61/770,056, filed on Feb. 27, 2013.

(51) Int. Cl.
| | |
|---|---|
| *B64C 3/40* | (2006.01) |
| *B64C 39/12* | (2006.01) |
| *B64C 5/04* | (2006.01) |
| *B64C 30/00* | (2006.01) |

(52) U.S. Cl.
CPC . *B64C 39/12* (2013.01); *B64C 3/40* (2013.01); *B64C 5/04* (2013.01); *B64C 30/00* (2013.01); *Y02T 50/145* (2013.01)

(58) Field of Classification Search
CPC .......... B64C 39/12; B64C 3/10; B64C 30/00; B64C 39/068; B64C 39/08
USPC ........................ 244/45 A, 45 R, 46, 47, 48, 49
See application file for complete search history.

(56) References Cited

U.S. PATENT DOCUMENTS

| | | | |
|---|---|---|---|
| 2,461,805 A | | 2/1949 | Barker |
| 3,737,121 A | | 6/1973 | Jones |
| 3,942,747 A | | 3/1976 | Wolkovitch |
| 3,971,535 A | | 7/1976 | Jones |
| 4,132,374 A | | 1/1979 | Abell |
| 4,336,913 A | * | 6/1982 | Hall ............................ 244/45 R |
| 4,365,773 A | | 12/1982 | Wolkovitch |
| 4,444,365 A | * | 4/1984 | Heuberger ...................... 244/48 |
| 4,541,593 A | * | 9/1985 | Cabrol ........................ 244/45 R |
| 4,856,736 A | | 8/1989 | Adkins et al. |
| 4,998,689 A | | 3/1991 | Woodcock |
| 5,899,410 A | | 5/1999 | Garrett |

(Continued)

FOREIGN PATENT DOCUMENTS

WO    WO 2014074146 A1 * 5/2014

OTHER PUBLICATIONS

Enns, Dale F., Bugajski, Daniel J., Klepl, Martin J., "Flight Control for the F-8 Oblique Wing Research Aircraft", IEEE Control Systems Magazine, Apr. 1988, pp. 81-86.

*Primary Examiner* — Benjamin P Lee

(74) *Attorney, Agent, or Firm* — Robert P. Lenart, Esq.; Pietragallo Gordon Alfano Bosick & Raspanti, LLP (57) ABSTRACT

An aircraft includes a fuselage, a main wing pivotally coupled to an aft portion of the fuselage, and a canard coupled to a forward portion of fuselage, wherein the main wing and the canard are configured to be connected together for supersonic flight and disconnected from each other for subsonic flight.

17 Claims, 10 Drawing Sheets

(56) References Cited

U.S. PATENT DOCUMENTS

| | | | |
|---|---|---|---|
| 5,984,231 A | 11/1999 | Gerhardt et al. | |
| 6,474,604 B1* | 11/2002 | Carlow | 244/198 |
| 6,729,577 B2 | 5/2004 | Morgenstern | |
| 6,923,404 B1 | 8/2005 | Liu et al. | |
| 6,986,481 B2* | 1/2006 | Fanucci et al. | 244/3.26 |
| 7,131,611 B2* | 11/2006 | Ferman | 244/39 |
| 7,841,559 B1* | 11/2010 | O'Shea | 244/46 |
| 8,220,737 B2* | 7/2012 | Wood et al. | 244/12.3 |
| 8,439,310 B2* | 5/2013 | Cazals et al. | 244/135 R |
| 8,444,082 B1* | 5/2013 | Foch | 244/49 |
| 8,690,096 B2* | 4/2014 | Alvarez Calderon | 244/6 |
| 8,757,538 B2* | 6/2014 | Seifert | 244/46 |
| D724,001 S * | 3/2015 | Garreau | D12/331 |
| 2005/0211827 A1* | 9/2005 | Barocela | 244/46 |
| 2008/0135677 A1* | 6/2008 | Oleshchuk et al. | 244/17.11 |
| 2012/0085858 A1* | 4/2012 | Seifert | 244/46 |
| 2013/0264428 A1* | 10/2013 | Rouyre | 244/45 R |
| 2015/0048215 A1* | 2/2015 | McGinnis | 244/90 R |

* cited by examiner

REFERENCE MISSION PROFILE

| Flight Phase | Description | Wing | Propeller | Jet |
|---|---|---|---|---|
| 1 | Takeoff and climb | Unswept | | ▓▓▓ |
| 2 | Supercruise | Swept | | ▓▓▓ |
| 3 | Descent to station | Swept to unswept | | ▓▓▓ |
| 4 | Loiter | Unswept | ▓▓▓ | |
| 5 | Return to base | Unswept | ▓▓▓ | |
| 6 | Descent | Unswept | | |
| 7 | Approach | Unswept | | ▓▓▓ |
| 8 | Go-around | Unswept | | ▓▓▓ |

CANARD-LOCKED OBLIQUE WING AIRCRAFT

CROSS-REFERENCE TO RELATED APPLICATION

This application claims the benefit of U.S. Provisional Patent Application Ser. No. 61/770,056, filed Feb. 27, 2013, which is incorporated herein by reference.

FIELD OF THE INVENTION

This invention relates to oblique wing aircraft.
BACKGROUND INFORMATION
Aircraft with oblique wings were proposed in Germany in the 1940's by Richard Vogt, and were subsequently the subject of additional research in the 1970's, spearheaded by Robert Jones of NASA. U.S. Pat. Nos. 3,737,121 and 3,971,535 to Jones disclose oblique wing supersonic aircraft. U.S. Pat. No. 5,984,231 to Gerhardt et al. discloses a switchblade fighter configuration including main wings which symmetrically sweep forward and backward.

Oblique wing aircraft can operate at low takeoff and landing speeds while providing efficient low speed loiter and efficient high-subsonic flight with minimum supersonic wave drag. However, the angle of wing sweep and wing aspect ratio are limited by the onset of aeroelastic divergence, thus limiting both supersonic performance (in the swept configuration) and subsonic performance (in the unswept configuration).

SUMMARY OF THE INVENTION

In one aspect, the present invention provides an aircraft including a fuselage, a main wing pivotally coupled to an aft portion of the fuselage, and a canard coupled to a forward portion of fuselage, wherein the main wing and the canard are configured to be connected together for supersonic flight and disconnected from each other for sub-supersonic flight.

This and other aspects of the present invention will be more apparent from the following description.

DETAILED DESCRIPTION

In various embodiments, this invention provides a canard-main wing aircraft (or canard-main wing-tailplane aircraft) that is configured with a variable-geometry oblique main wing that can be coupled to a canard to provide structural bracing.

The main wing is connected to the canard for supersonic flight and disconnected from the canard for sub-supersonic flight. Supersonic performance is achieved when the main wing is in the swept configuration and subsonic performance is achieved when the main wing is in the unswept configuration.

This configuration allows the use of a very high aspect ratio main wing that can be highly swept, thus improving subsonic range and endurance while preserving supersonic performance. The aspect ratio of a wing refers to the square of its span divided by its area. A high aspect ratio indicates a long, narrow wing. As used in this description, high aspect ratio is an aspect ratio of greater than 15.

Figure 1:
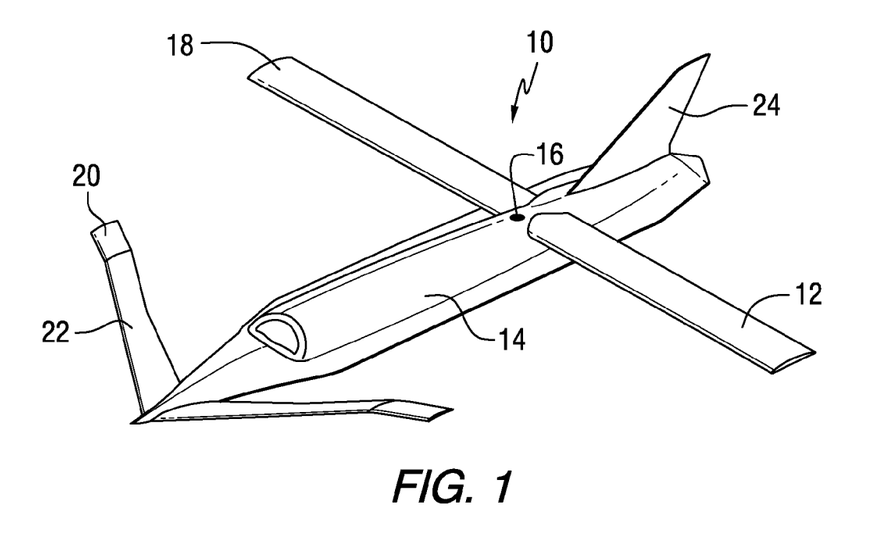
FIG. 1 is a schematic view of an aircraft in accordance with an embodiment of the invention.
Figure 2:
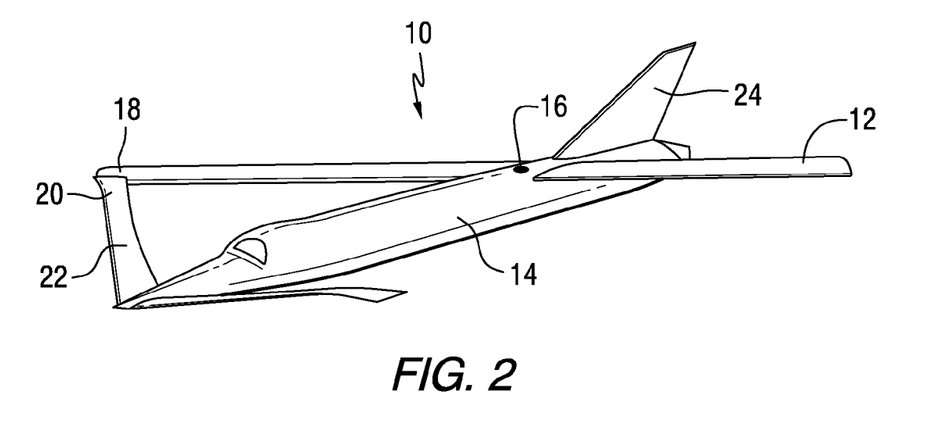
FIG. 2 is a schematic view of the aircraft of FIG. 1 with the main wing in the swept position.

FIGS. 1 and 2 illustrate a canard-locked oblique wing aircraft 10 in accordance with an embodiment of the invention. In FIG. 1, a high aspect ratio aft mounted main wing 12 is pivotally coupled to a top surface of a fuselage 14 of the aircraft at a pivot point 16. In FIG. 1, the main wing is positioned substantially symmetrically in relation to the longitudinal axis of the aircraft. In FIG. 2, the main wing 12 is moved to an oblique position in which a tip 18 of the main wing is connected to a starboard end 20 of a forward canard 22. A vertical stabilizer 24 is provided at an aft portion of the fuselage.

The embodiment of FIGS. 1 and 2 includes a canard dual lifting surface arrangement with a pivoting oblique main wing. In its asymmetrically-swept position, the forward-reaching portion of the main wing mechanically locks to the canard to reduce the effects of the classic oblique-wing problem of aeroelastic divergence. Structural depth in the vertical plane is important. The canard and main wing can be mounted to the opposing fuselage surfaces so as to maximize resistance to bending of the joined wing assembly and to minimize the prospect of canard downwash impinging on the main wing, with the provision of canard anhedral or dihedral sufficient to allow the canard to lock to the main wing.

Figure 3:
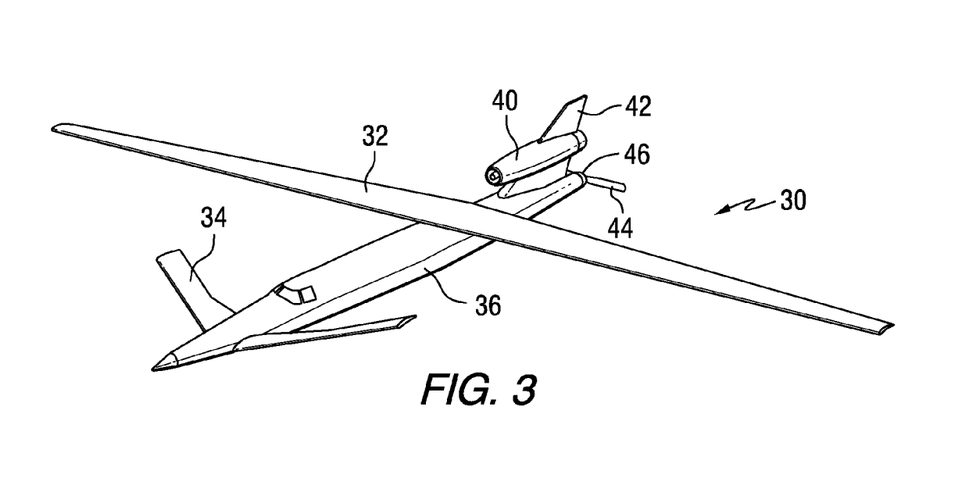
FIG. 3 is a schematic view of an aircraft in accordance with another embodiment of the invention.
Figure 4:
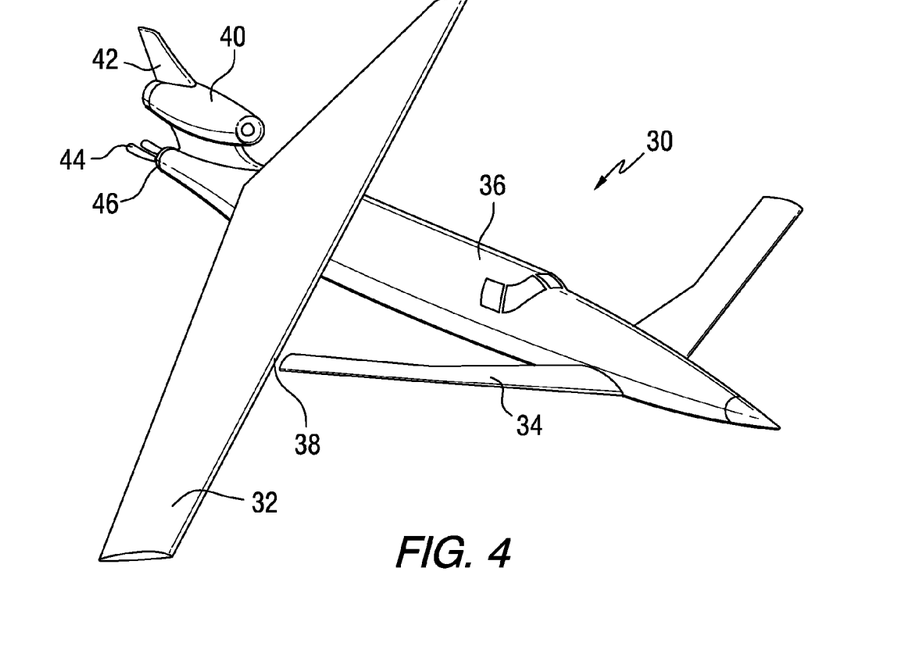
FIG. 4 is a schematic view of the aircraft of FIG. 3 with the main wing in the swept position.

FIGS. 3 and 4 illustrate a canard-locked oblique wing aircraft 30 in accordance with another embodiment of the invention. The aircraft 30 includes a main wing 32 coupled to an aft portion of a top surface of a fuselage 36 and a canard 34 coupled to a forward portion of a bottom surface of the fuselage. In FIG. 3, the main wing 32 of the aircraft is symmetrical in relation to the longitudinal axis of the aircraft. In FIG. 4, the main wing of the aircraft is moved to an oblique position in which an outer lateral station of the main wing is connected to a starboard end of the forward canard 34. As shown in FIG. 4, when the main wing is in the swept position, the forward swept main wing couples to the canard at an intermediate point 38 on the main wing. The embodiment of FIGS. 3 and 4 also includes two propulsion means in the form of a turbojet engine 40 connected to the tail fin 42 and a propeller 44 coupled to a turboprop engine 46. The engines may be vertically stacked to avoid yaw trim drag.

The turbojet and turboprop propulsion systems are provided so that the propulsion system characteristics can be matched with the aircraft aerodynamic characteristics. At low speeds, the turboprop propulsion can be used, while at high speeds, the turbojet engine can be used and the turboprop can be shut down. In addition to enabling long range supersonic cruise, the turbojet may be used for takeoff, climb, approach, and go-around phases of flight. When not in use, the turboprop's propeller blades can either fold in a trailing position, or can be feathered and brought forward into slots on the aft portion of the fuselage.

An advantage of this configuration is that the turboprop can be optimized for a single design point. Consequently, the propeller may be of very simple, fixed pitch design. The turboprop's core aerodynamic efficiency can be optimized without regard for variations in rotational speed or transient operation. Furthermore, the high aerodynamic efficiency of this aircraft while in loiter configuration, due to its high aspect ratio wings, results in a directly consequential reduction in the power required from the turboprop while in that phase of flight, this being a very strongly synergistic design feature.

Figure 5:
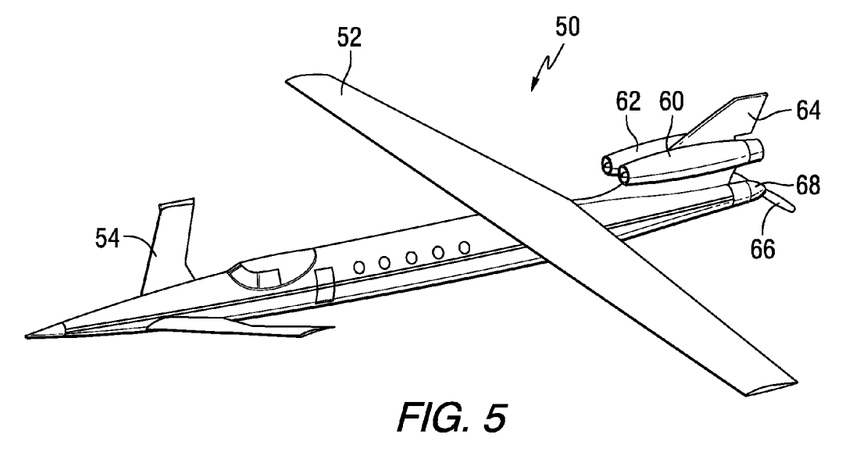
FIG. 5 is a schematic view of another aircraft in accordance with an embodiment of the invention.
Figure 6:
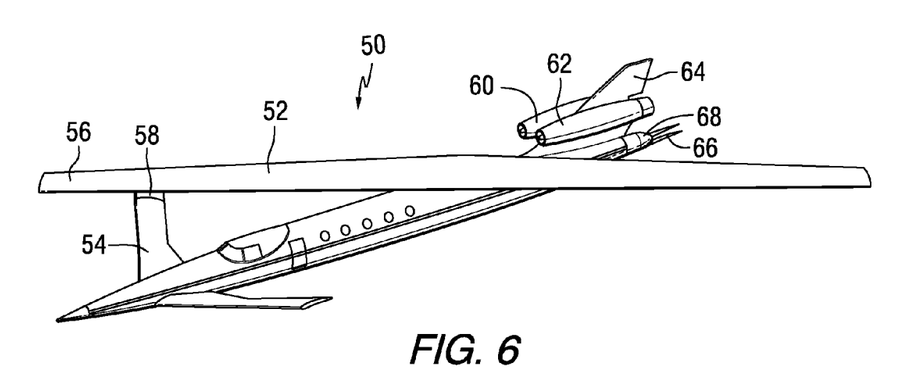
FIG. 6 is a schematic view of the aircraft of FIG. 5 with the main wing in the swept position.

FIGS. 5 and 6 illustrate a canard-locked oblique wing aircraft 50 in accordance with another embodiment of the invention. The aircraft 50 includes a main wing 52 coupled to an aft portion of a top surface of a fuselage and a canard 54 coupled to a forward portion of a bottom surface of the fuselage. In FIG. 5, the main wing 52 of the aircraft is symmetrical in relation to the longitudinal axis of the aircraft. In FIG. 6, the main wing of the aircraft is moved to an oblique position in which an outer lateral station of the main wing is connected to a starboard end of the forward canard 54. As shown in FIG. 6, when the main wing is in the swept position, the forward swept portion 56 of the main wing couples to the canard at an intermediate point 58 of the main wing. The embodiment of FIGS. 5 and 6 also includes two turbojet engines 60 and 62 connected to tail fin 64 and a propeller 66 coupled to a turboprop engine 68. FIGS. 5 and 6 show a civilian version of the aircraft. For regulatory reasons, it is highly desirable to have more than one primary cruise engine. The civilian version has no requirement to loiter but does need to ferry efficiently (at a higher-than-loiter speed), so the main wing is likely to have somewhat lower aspect ratio than a military version.

Figure 7:
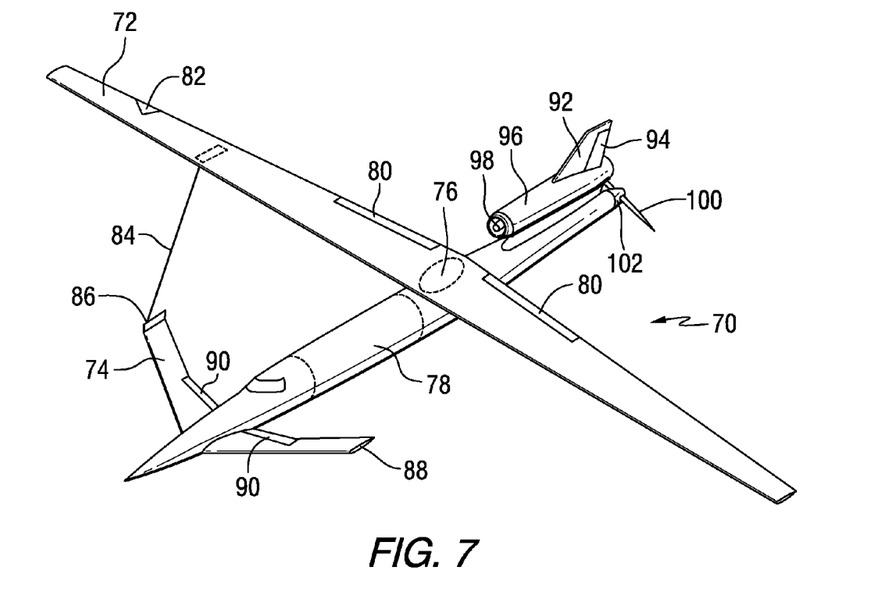
FIG. 7 is a schematic view of another aircraft in accordance with an embodiment of the invention.
Figure 8:
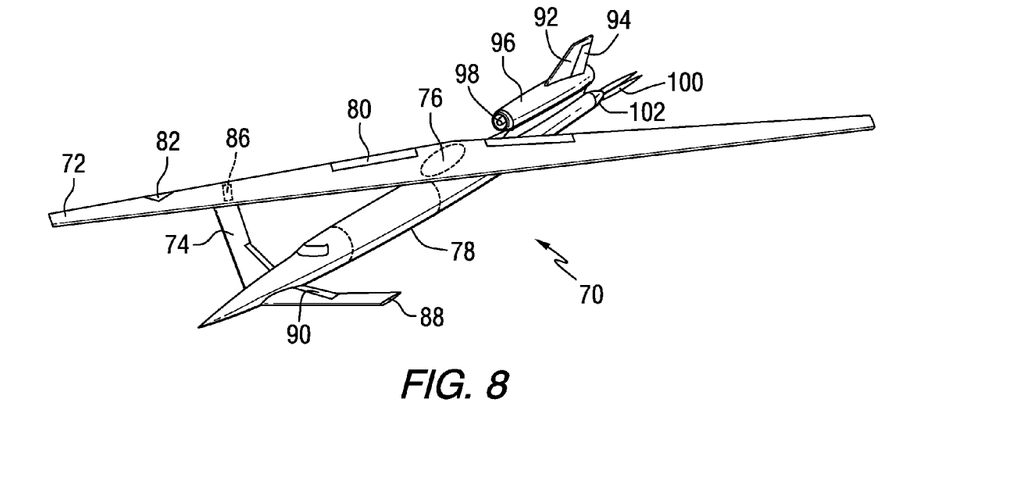
FIG. 8 is a schematic view of the aircraft of FIG. 7 with the main wing in the swept position.

FIG. 7 is a schematic view of a canard-locked oblique wing aircraft 70 in accordance with another embodiment of the invention. The aircraft 70 includes a main wing 72 coupled to an aft portion of a top surface of a fuselage 78 and a canard 74 coupled to a forward portion of a bottom surface of the fuselage. FIG. 8 is a schematic isometric view of the canard-locked oblique wing aircraft shown in FIG. 7, with the main wing 72 of the aircraft moved to an oblique position in which the main wing is connected to a starboard end of the forward canard 74.

An aerodynamically-faired wing pivot 76 couples the main wing to the fuselage 78. Roll controls and flap controls are provided in the form of flaperons 80. The flaperons can be primarily used when the main wing is in the unswept position. Guidance control surfaces 82 assist with wing positioning for wing docking. A guidance line 84 assists with wing positioning when docking the main wing to the canard.

In one example, a winch can be used to haul a tip of the main wing into the canard using permanently-mounted low-drag line. In FIG. 8, a winch receptacle 86 is provided to maintain tension on the guideline and mechanically lock the main wing to the canard. A winch may be mounted in either the main wing or the canard. Low tension would be required until the terminal phase of docking.

A locking mechanism that couples the main wing to the canard can include components in both the main wing and the canard. A port portion 88 of the canard can serve as a full-flying surface for additional control. Elevon 90 serves as a canard-mounted roll and pitch control.

A tailfin 92 is provided near an aft end of the fuselage. A rudder 94 on the tailfin provides a yaw control surface. A turbofan engine 96 is coupled to the tailfin. An axisymmetric shock cone 98 can traverse forward from the housing of the turbofan to block off the inlet to the turbofan engine during slow speed operation. A folding propeller 100 serves as a loiter/slow speed cruise propeller that is driven by a turboprop propulsion unit 102. For high speed operation, the propeller can be folded as shown in FIG. 8 to reduce drag.

Figure 9:
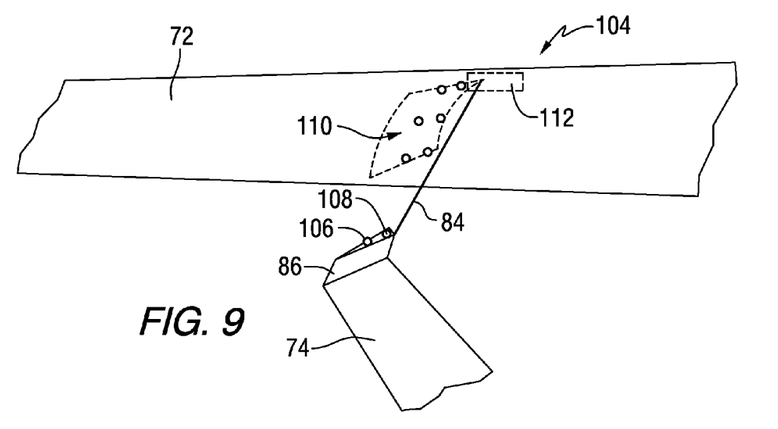
FIG. 9 is a schematic representation of a guidance and locking mechanism that can be used to couple a main wing to a canard.

FIG. 9 is a schematic illustration of one example of a mechanism for joining and locking the canard 74 and the main wing 72. A multi-pin arrangement 104 allows tailoring of aeroelastic properties via the joint. At different phases of flight and during different loading conditions, it may be desirable to vary the specific point of wing-canard connection so as to optimize resistance to bending, resistance to torsion, and critically, to beneficially influence coupling of bending and torsion in the connected structure. This embodiment of the invention includes one or more sensors and a signal processing device for sensing and calculating in real time the aeroelastic properties of the formed canard-wing structure, and for communicating that data to a control system for the canard-wing locking mechanism.

FIG. 9 shows an example of a dual-pin mechanism. Either or neither of pins 106 and 108 can be left retracted, thus influencing the torsional stiffness of the formed wing-canard structure. A canard-receptacle 110 in the lower surface of the main wing 72 includes three pairs of pin receptacles, any of which can be selected for docking depending upon aerostructural considerations. In this example, a winch 112 is installed within the main wing 72 close to its trailing edge. A permanently-mounted low-drag cable or line 84 can be provided to haul in and couple the main wing 72 to the canard 74. Alternatively, the winch can be mounted in the canard. Low tension may be required until the terminal phase of docking. This represents a relatively simple approach in which terminal guidance sensors and mechanisms may not be required.

Alternative methods for joining and locking canard and main wing can be provided. Joining may be achieved by flying the wingtip into the canard with a programmed aircraft pull-up or pushover, taking into account known schedules of wing bending as a function of weight and normal load. A flight control mode may be implemented in hardware, calculating instantaneous aircraft weight from available fuel state and payload state data, and using accelerometer data to derive normal load, then using a look-up table to determine wing position. Terminal guidance sensors and mechanisms for final docking may be included.

Figure 15:
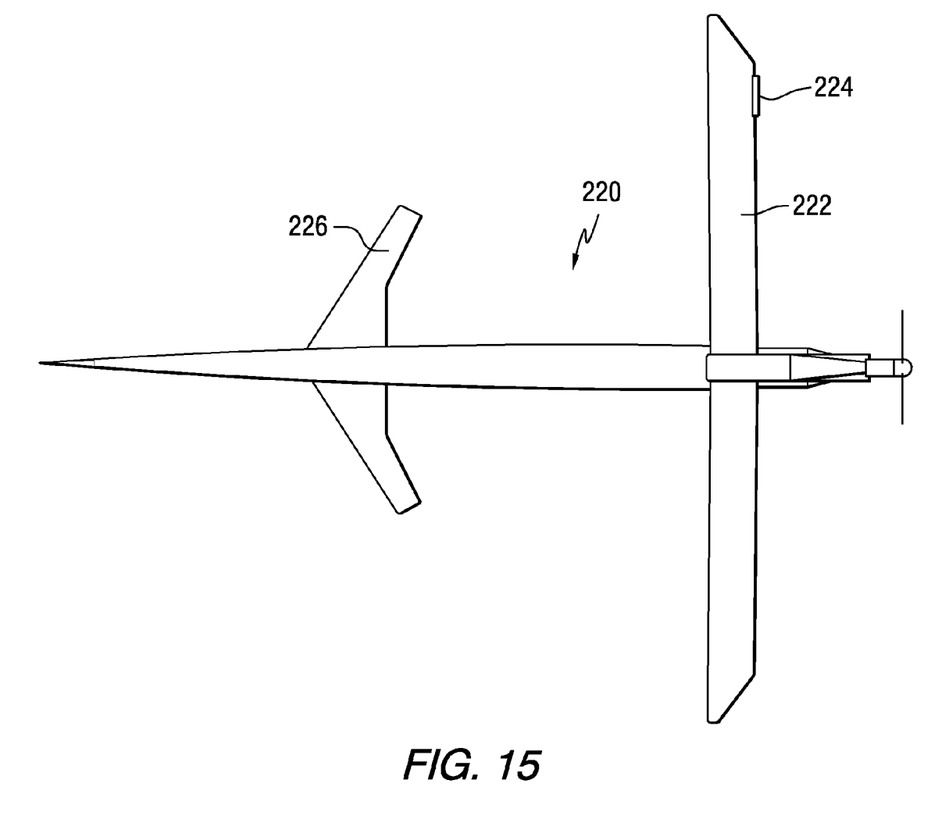
FIG. 15 is a plan view of the aircraft of FIG. 11A, showing an embodiment of the invention including a controllable aerodynamic surface on the starboard main wing to facilitate the wing sweeping and locking procedure.

In another embodiment of the invention, a dedicated control surface on the main wing can be used to actively fly a tip of the main wing into the canard. Guidance sensors and mechanisms can be included for final docking. FIG. 15 is a plan view of another aircraft 220 in accordance with an embodiment of the invention having a main wing 222 which includes a control surface 224 that can be used to move the main wing into engagement with the canard 226. Joining may be achieved by actively flying the main wing wingtip into the canard with a dedicated control surface on the main wingtip.

In various embodiments, the described means and methods of guiding the main wing to the canard tip and locking it (i.e., programmed pitch maneuvers, guideline, and dedicated control surfaces) may be used alone or in combination.

Figure 10:
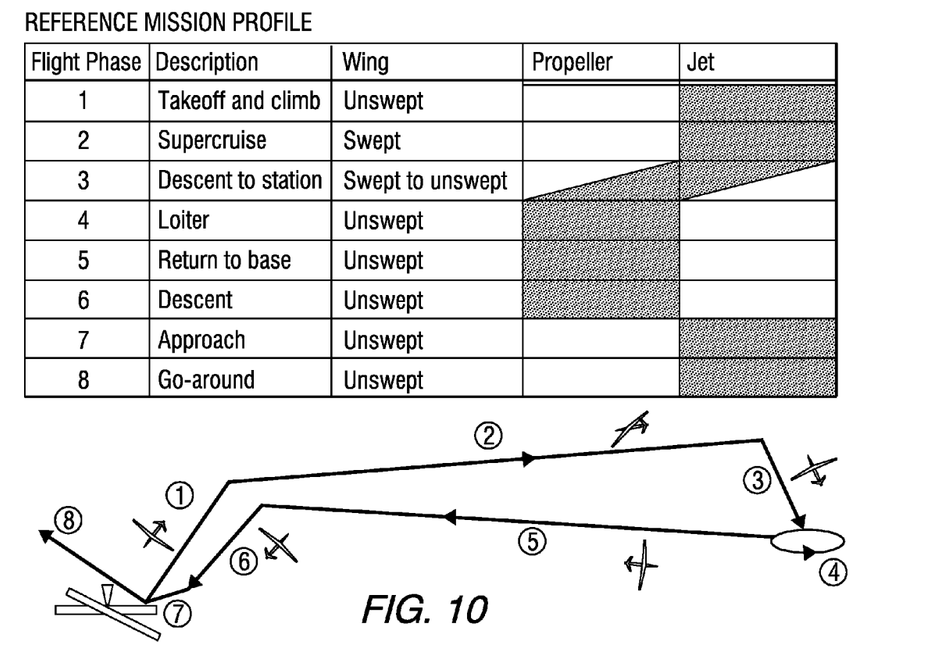
FIG. 10 is a schematic representation of a mission profile with associated configurations that could be used by an aircraft constructed in accordance with an embodiment of the invention.

FIG. 10 schematically illustrates a reference mission profile for an aircraft in accordance with an embodiment of the present invention. For each flight phase 1-8, the position of the main wing is listed in the table, along with the particular engine(s) used during each phase.

Figure 11A:
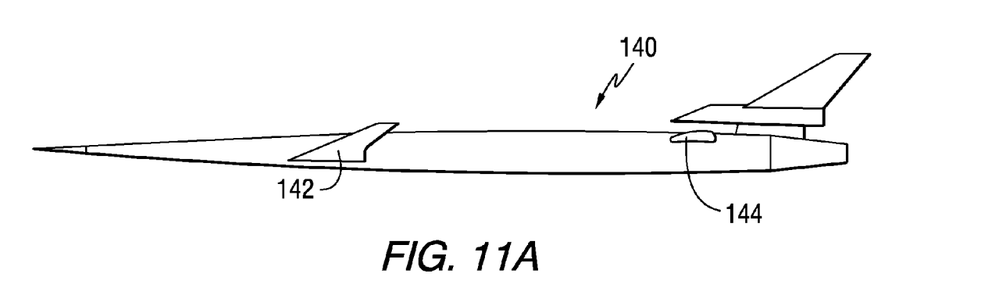
FIG. 11A is a side view of another aircraft in accordance with an embodiment of the invention.
Figure 11B:
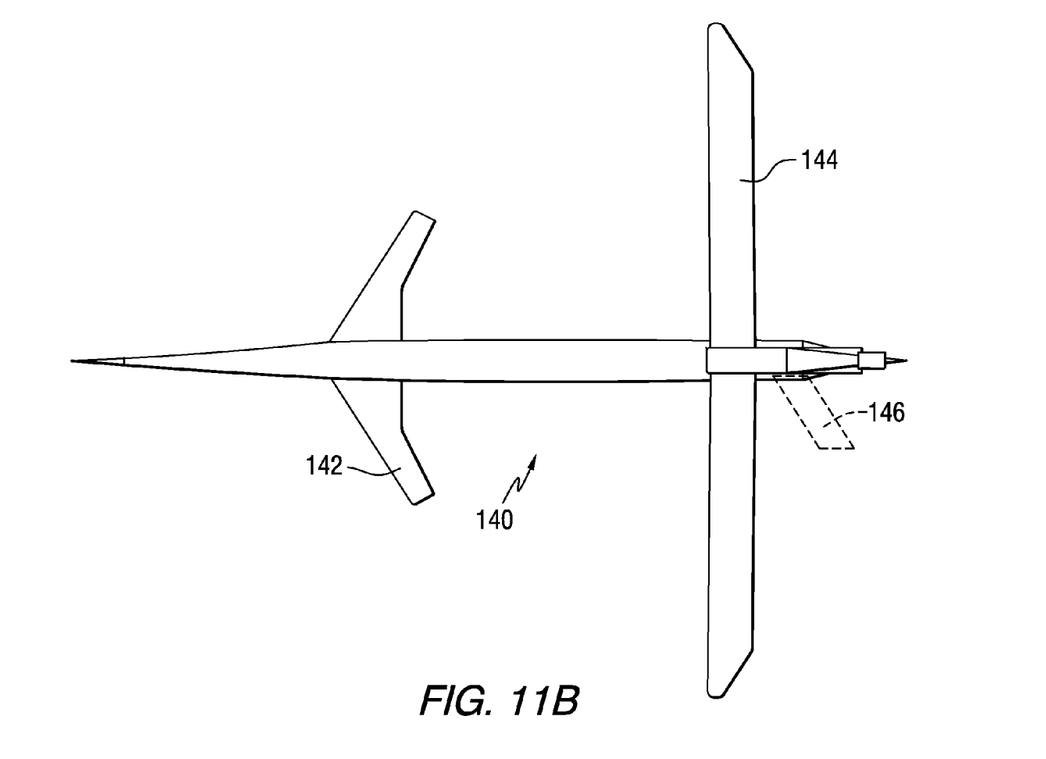
FIG. 11B is a plan view of the aircraft of FIG. 11A.
Figure 12A:
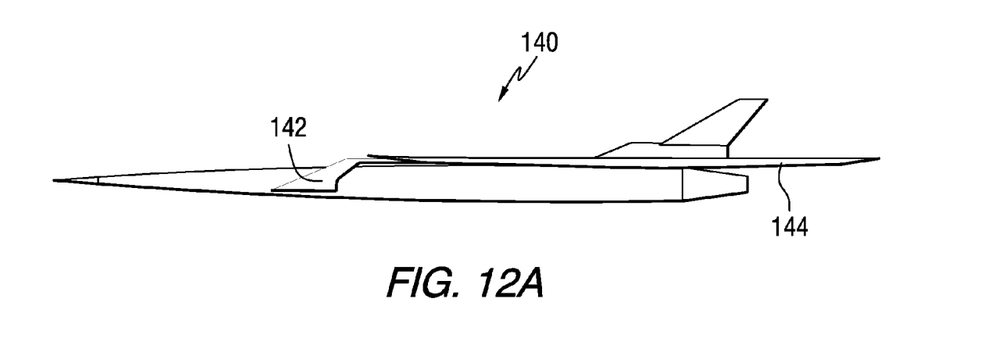
FIG. 12A is a side view of the aircraft of FIG. 11A with the main wing in the swept position.
Figure 12B:
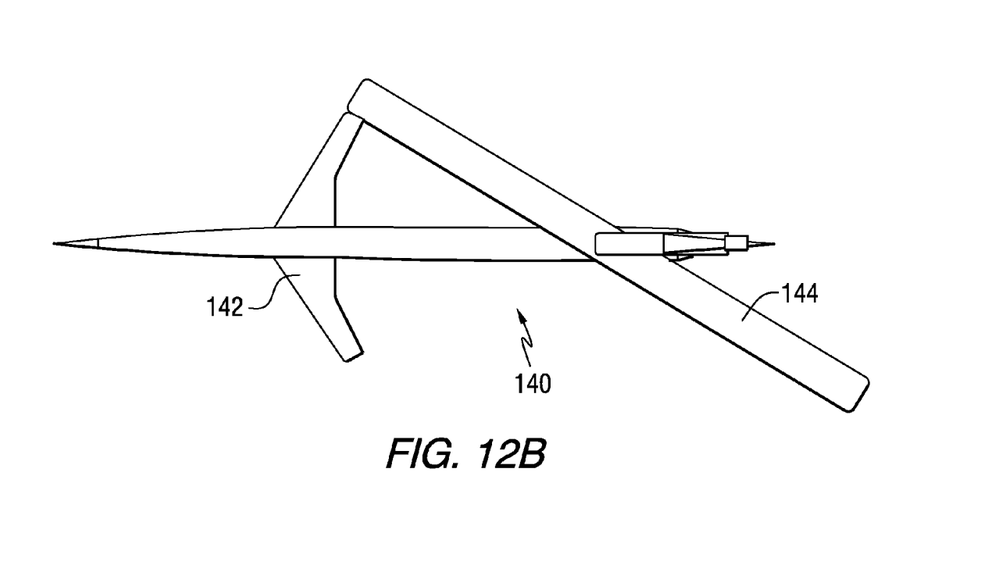
FIG. 12B is a plan view of the aircraft of FIG. 11B with the main wing in the swept position, showing an aircraft with the main wing locked to the canard at a position inboard of the main wing's wing tip.

FIG. 11A is a side view of another aircraft 140 in accordance with an embodiment of the invention. FIG. 11B is a plan view of the aircraft of FIG. 11A. In the embodiment of FIGS. 11A and 11B, to minimize wave drag, the canard 142 may be thin and stiff, and may have a minimum span. The minimum span corresponds to a high main wing sweep angle, and may influence the contact point with the main wing, e.g., possibly not at the main wing tip. The main wing 144 is designed to flex for structural efficiency, and thus lightness. The aircraft may comprise a wet wing to maximize endurance, at least for some partial span. A three wing arrangement may alternatively be used, as shown by the dashed outline of a tailplane 146 in FIG. 11. A three wing arrangement, by providing another lift surface, would relax some of the design constraints imposed on the canard, albeit likely at the cost of increased drag. FIG. 12A is a side view of the aircraft of FIG. 11A with the main wing in the swept position. FIG. 12B is a plan view of the aircraft of FIG. 11A with the main wing in the swept position.

Figures 13A, 13B:
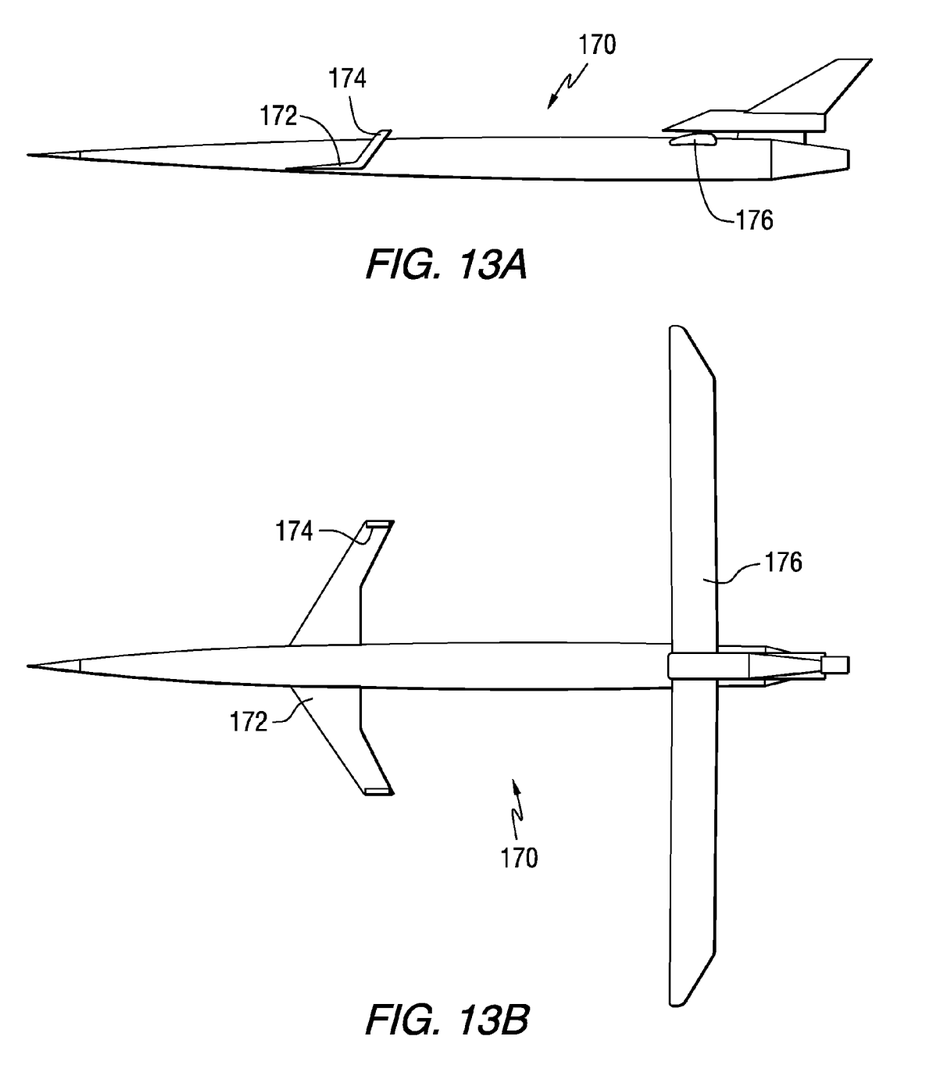
FIG. 13A is a side view of another aircraft in accordance with an embodiment of the invention, showing a canard with vertical winglets mounted at the canard tip for the purpose of docking to the main wing without the necessity of canard dihedral.
FIG. 13B is a plan view of the aircraft of FIG. 13A.

FIG. 13A is a side view of another aircraft 170 in accordance with an embodiment of the invention. FIG. 13B is a plan view of the aircraft of FIG. 13A. The embodiment of FIGS. 13A and 13B illustrates an alternative embodiment to achieve vertical depth. The configuration includes a zero dihedral angle canard 172 with winglets 174 and a connection with the main wing 176 at the canard's winglet tip. Canard winglets would be desirable in two instances: if a canard with high dihedral or anhedral results in unfavorable aircraft flying qualities; or if a canard with high dihedral or anhedral resulted in the impingement of canard downwash on the main wing, causing longitudinal trim issues and a possible loss of aerodynamic efficiency.

Figure 14A:
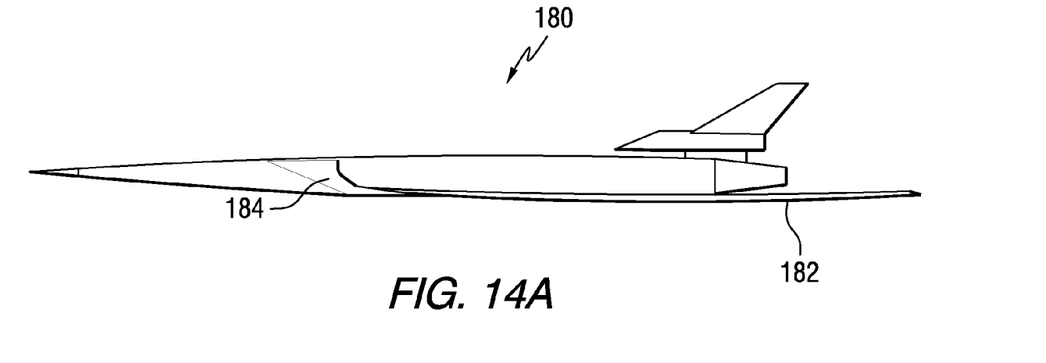
FIG. 14A is a side view of another aircraft in accordance with an embodiment of the invention, showing a canard mounted to the upper fuselage with anhedral allowing it to lock to a main wing mounted to the lower fuselage.
Figure 14B:
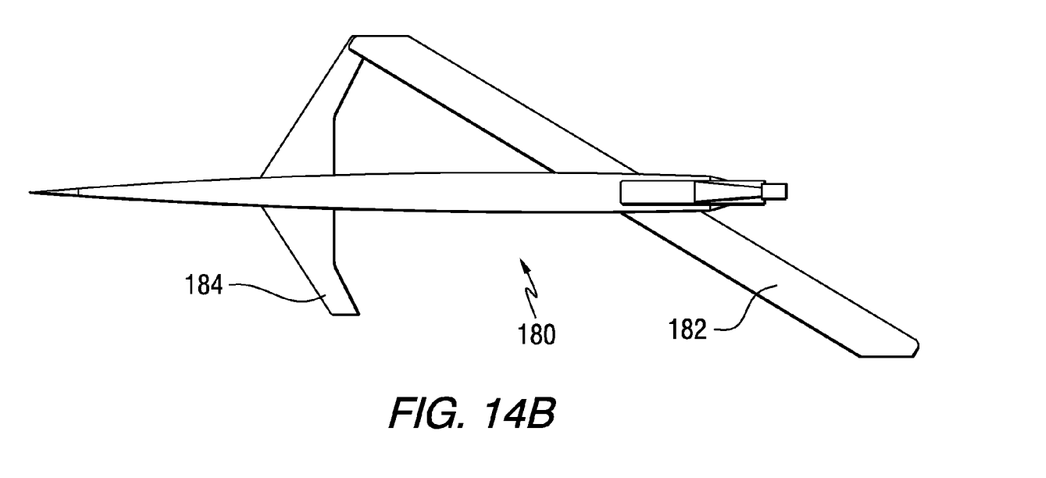
FIG. 14B is a plan view of the aircraft of FIG. 14A.

FIG. 14A is a side view of another aircraft 180 in accordance with an embodiment of the invention. FIG. 14B is a plan view of the aircraft of FIG. 14A. The embodiment of FIGS. 14A and 14B shows an alternative embodiment including a main wing 182 that is mounted to the bottom of an aft portion of the fuselage, and a high-set canard 184 with an anhedral angle orientation.

In the various illustrated embodiments, the aircraft can transform from a symmetrical-wing orientation in which the aircraft is powered by a low speed engine, to an oblique-wing configuration in which the aircraft is powered by a high speed supersonic engine. Some phases of flight, however, demand the combination of the symmetrical-wing orientation with the use of the higher-power high speed supersonic engine. One particular case, the time during which the wing is transiting from a symmetrical-wing orientation to the oblique wing configuration, also requires the use of the higher-power high speed supersonic engine.

The various embodiments can provide low takeoff and landing speeds; efficient low speed loiter; efficient maximum range cruise; a high aspect ratio, a light wing box; efficient supersonic flight; minimized wave drag; minimized trim change; and/or potential low sonic boom configurations. Low-speed benefits are maximized when the main wing has a low sweep; high-speed benefits are maximized when the main wing has a high sweep; and maximum benefits accrue with both a high sweep and high aspect ratio.

The described configurations of variable-geometry oblique-winged aircraft include a fuselage, a vertical stabilizer, a pivoting main wing mounted on the aft fuselage, a forward-mounted canard, and optionally, a tailplane. In its asymmetrically-swept position, the forward-reaching main wing mechanically locks to the canard so as to minimize the classic oblique-wing problem of aeroelastic divergence. The canard is preferably mounted to the fuselage in vertical opposition to the main wing so as to maximize resistance to bending of the joined wing assembly and to minimize the prospect of canard downwash impinging on the main wing. Other aspects of the embodiments include the provision of turbojet and turboprop propulsion so as to match propulsion system characteristics with aircraft aerodynamic characteristics; and the provision of a winch and line to mechanically guide the leading edge of the main wing into its mating mechanism on the canard, and/or a dedicated aerodynamic control surface mounted to the main wing to achieve the same objective.

The canard-locked oblique wing configuration allows a flexible, high aspect ratio wing to be swept into a highly oblique position. The described embodiments have the potential to maximize both loiter and dash performance in a way unachievable by either a wing-body-tail oblique wing aircraft or an oblique flying wing. Several synergistic advantages are enabled by the configuration.

Whereas particular embodiments of this invention have been described above for purposes of illustration, it will be evident to those skilled in the art that numerous variations of the details of the disclosed embodiments may be made without departing from the invention as defined in the appended claims.

What is claimed is:

1. An aircraft comprising:
   a fuselage;
   a main wing pivotally coupled to an aft portion of the fuselage; and
   a canard coupled to a forward portion of fuselage;
   wherein the main wing and the canard are configured to be connected together for supersonic flight and disconnected from each other for subsonic flight.

2. The aircraft of claim 1, further comprising:
   one or more turbojet engines and a turboprop engine.

3. The aircraft of claim 2, wherein the turboprop engine includes a propeller having foldable blades.

4. The aircraft of claim 1, wherein the main wing and the canard are mounted to the fuselage in vertical opposition, with the canard coupled to a bottom surface of the fuselage and oriented at a dihedral angle, 5. The aircraft of claim 1, wherein the main wing and the canard are mounted to the fuselage in vertical opposition, with the canard coupled to an upper surface of the fuselage and oriented at an anhedral angle.

6. The aircraft of claim 1, wherein the canard has zero dihedral angle and includes winglets configured to be connected to the main wing.

7. The aircraft of claim 1, wherein when the main wing is in an asymmetrically-swept position, a forward-reaching portion of the main wing mechanically locks to the canard.

8. The aircraft of claim 1, further comprising:
a winch and line configured to mechanically guide a forward-reaching portion of the main wing into a mating mechanism on the canard.

9. The aircraft of claim 1, wherein the main wing and the canard are configured to be connected together at an intermediate point on a forward swept portion of the main wing.

10. The aircraft of claim 1, further comprising:
a vertical stabilizer coupled to the fuselage.

11. The aircraft of claim 1, further comprising:
a tailplane coupled to an aft portion of the fuselage.

12. The aircraft of claim 1, further comprising:
a winch mounted in either the canard or the main wing.

13. The aircraft of claim 1, further comprising:
a locking mechanism for coupling the main wing to the canard.

14. The aircraft of claim 1, further comprising:
a locking mechanism for coupling the main wing to the canard and including of an array of pins or connectors that can be engaged to tailor aeroelastic properties of a formed canard-wing structure.

15. The aircraft of claim 1, further comprising:
at least one sensor and processing device for sensing and calculating aeroelastic properties of a formed canard-wing structure, and for communicating data to a control system for a canard-wing locking mechanism.

16. The aircraft of claim 1, further comprising:
a dedicated control surface on the main wing configured to fly the main wing into a locking position with the canard.

17. The aircraft of claim 1, further comprising:
at least one sensor and processing device for accomplishing a programmed aircraft pull-up or pushover maneuver, in order to fly the main wing into a locking position with the canard.

* * * * *